United States Patent
Albert et al.

(10) Patent No.: US 6,196,332 B1
(45) Date of Patent: Mar. 6, 2001

(54) ROTATIONAL ENERGY STORAGE DEVICE AND TOOLS INCORPORATING SAME

(75) Inventors: Gregory P. Albert, Nazareth, PA (US); David B. Stahlman, Bryan, OH (US); Timothy R. Cooper, Titusville; James P. Ryan, Jersey City, both of NJ (US)

(73) Assignee: Ingersoll-Rand Company, Woodcliff Lake, NJ (US)

( * ) Notice: Subject to any disclaimer, the term of this patent is extended or adjusted under 35 U.S.C. 154(b) by 0 days.

(21) Appl. No.: 09/204,693

(22) Filed: Dec. 3, 1998

(51) Int. Cl.$^7$ ..................................... B23Q 5/00
(52) U.S. Cl. .................. 173/176; 173/93; 173/93.5; 173/181; 173/217
(58) Field of Search .................. 173/176, 178, 173/93, 93.5, 93.6, 181, 217; 464/37, 34, 35, 41; 81/51.9, 467, 470

(56) References Cited

U.S. PATENT DOCUMENTS

| | | | |
|---|---|---|---|
| Re. 35,617 | * 9/1997 | Krivec ................................. | 173/178 |
| 3,552,499 | * 1/1971 | Maurer ................................. | 173/93.5 |
| 3,942,338 | * 3/1976 | Furlette et al. ...................... | 464/37 |
| 4,056,953 | * 11/1977 | Furlette et al. ...................... | 464/37 |
| 4,347,902 | * 9/1982 | Wallace et al. ...................... | 173/93.5 |
| 4,610,340 | * 9/1986 | Helmes et al. ...................... | 464/35 |
| 4,883,130 | * 11/1989 | Dixon ................................. | 173/178 |
| 5,672,110 | * 9/1997 | Kurita et al. ........................ | 464/37 |
| 5,845,718 | 12/1998 | Cooper et al. ...................... | 173/176 |
| 5,848,655 | 12/1998 | Cooper et al. ...................... | 173/176 |
| 5,984,022 | * 11/1999 | Harman, Jr. et al. ................ | 173/176 |
| 6,000,512 | * 12/1999 | Cronin et al. ....................... | 464/35 |

FOREIGN PATENT DOCUMENTS

| | | |
|---|---|---|
| 1 625 670 | 8/1970 | (DE) . |
| 2 465 920 | 3/1981 | (FR) . |

OTHER PUBLICATIONS

PCT International Search Report dated Apr. 18, 2000 for International Application No. PCT/US 99/27246.

* cited by examiner

*Primary Examiner*—Peter Vo
*Assistant Examiner*—Jim Calve
(74) *Attorney, Agent, or Firm*—Leon Nigohosian, Jr.

(57) ABSTRACT

A rotational energy storage device or spring which includes a roller-cam assembly having a shaft, a ring rotatably disposed about the shaft, and at least one roller disposed between shaft and ring. The roller is configured such that, upon rotating the ring relative to the shaft, the roller interferes with the ring and the shaft to convert and effect storage of mechanical energy created by the relative rotation of the ring and the shaft. Preferably a plurality of spaced rollers are positioned between ring and shaft. A cam geometry which is symmetrical or asymmetrical is provided on the shaft, the ring, the roller, and combinations thereof. A rotational energy storage device having a back-up ring with alternating thin and thick cross-sectional areas is further provided which is indexed to provide regions of low and high stiffness regions against each roller.

11 Claims, 16 Drawing Sheets

ROTATIONAL ENERGY STORAGE DEVICE AND TOOLS INCORPORATING SAME

The invention relates generally to rotational energy storage devices including springs and more particularly to rotational energy storage devices that may be used in inertia based torquing tools.

Springs are components or devices that, with high efficiency, store energy as they deflect under an applied force, e.g., torque, force, bending moment, or any combination thereof, and release the stored energy as they return to their original position when the applied force is removed. Their primary characteristic is that they deflect either linearly or non-linearly in proportion to the amplitude and direction of the applied force. Various types of springs are used in machines and tools to store energy as they deflect and react applied forces. Some examples of real springs include helical-wound torsion springs, helical-wound compression springs, torsion bars, multiple-leaf springs, and gas-filled bladders.

Springs are used in various applications, e.g., in low reaction tools for tightening threaded fasteners. These tools are typically devices that accelerate a rotary inertia mass through a relatively large travel angle. This acceleration is developed using a motor with a torque output that is relatively low compared to the output torque capability of the tool. As the inertia mass accelerates, it develops kinetic energy. After the inertia mass has traveled through a significant angle (for example, 180 degrees or more), a clutching means engages the rotary inertia mass to a workpiece, via some type of torsion spring. The subsequent negative acceleration of the inertia mass results in a torque output that is relatively high compared to that supplied by the accelerating motor. This high torque output is not reacted on the user, as the reaction is provided by the torque associated with the negative acceleration of the flywheel or inertia mass.

In order to tighten a threaded fastener, one must rotate a bolt via applying a torque to clamp a joint. All bolts have some lead or helix angle that permits the clockwise rotation, for right-hand fasteners, to translate a nut or member to cause tension in the bolt. This angle makes the bolt more difficult to turn (i.e., higher torque) when clamping a joint versus the reverse direction, which is loosening a joint. When considering a low reaction tool with an oscillatory drive system, having an energy storage device which applies an equal forward and reverse torque to the fastener will cause the joint to loosen for the reason discussed above.

In commonly assigned U.S. patent application Ser. No. 08/865,037 (now U.S. Pat. No. 5,845,715) titled "Resonant Oscillating MassBased Torquing Tool," which application is incorporated herein by reference, a resonant torquing tool is disclosed which overcomes this obstacle by applying a bias torque on the drive motor so that the developed tightening torque is greater that the loosening torque. This bias torque, however, creates a bias torque on the tool housing which must be reacted by the operator. For low torque range tools, where the bias torque would be small, this may be appropriate.

In a second commonly assigned U.S. patent application Ser. No. 08/865,043 (now U.S. Pat. No. 5,848,655) titled "Oscillating Mass-Based Tool With Dual Stiffness Spring," which application is incorporated herein by reference, a resonant torquing tool is disclosed which uses a dual stiffness spring. As taught therein, the dual stiffness spring has a greater resistance to torsion (i.e., greater stiffness) in the tightening direction and a smaller resistance to torsion (i.e., softer stiffness) in the loosening direction. The energy used for torquing a workpiece is developed by oscillating a mass spring system at or near its resonant frequency, with the means for biasing the output torque being provided by the dual stiffness spring. This system provides for a reactionless tightening system by significantly reducing or eliminating the resultant net torque on the tool housing. As a result, this system is particularly well suited for higher torque range tools.

In designing springs for these low reaction torquing tools, as well as for a variety of other applications, one important characteristic is how the torque applied varies with the angular displacement of the spring. Dual stiffness springs such as those described in allowed U.S. patent application Ser. No. 08/865,043 (now U.S. Pat. No. 5,848, 655) provide for torque-angle relationships (i.e., spring stiffnesses) that differ depending on the direction of applied torque. While these stiffnesses differ in the forward and reverse torsioning directions, they are only slightly nonlinear in each direction, and, while not impossible, it is not easy to tailor the torque-angle relationship of these springs to provide various linear or non-linear stiffness profiles in either or both directions. It would be desirable to provide a spring in which the torque-angle relationship could be easily tailored to provide a substantially different linear or nonlinear spring stiffness when being deflected in either or both directions. This would provide designers and engineers greater flexibility than that provided by typical torsion springs and bars.

When torque is applied to a rotational spring such that it displaces angularly, work is done on the spring and the spring stores energy. If the spring is purely elastic, all the energy stored is recoverable by allowing the spring to rotate back through its displaced angle, and the spring is said to be 100% efficient. FIG. 1 shows an example of a torque-angle relationship for a rotational spring exhibiting such an elastic relationship. If the spring is not purely elastic, as is the case with all real springs, some amount of energy is lost as the spring rotates back through its displaced angle and only a portion of the stored energy is recoverable. FIGS. 2 and 3 show examples of torque-angle relationships for rotational springs exhibiting inelastic, "lossy" behavior in which the amount of energy lost is represented by the area between the curves shown. In many applications a highly elastic spring is desirable, while in other applications a less elastic spring may be desirable. Thus, it would be desirable to provide a spring design in which the degree of elasticity can easily be varied, from almost 100% efficiency to some desired lower efficiency.

Another design criteria known as the load capacity, that is, the maximum torque that can be applied to the energy storage device without damaging it is also important. In many applications, the volume required to house the energy storage device is also important. Thus, an energy storage device having a high load capacity and small package size would also be desirable.

The foregoing illustrates limitations known to exist in present springs. Thus it is apparent that it would be advantageous to provide an alternative spring design directed to overcoming one or more of the limitations set forth above. Accordingly, a novel spring is provided including the features more fully disclosed hereinafter.

SUMMARY OF THE INVENTION

According to the present invention, a rotational energy storage device or spring is provided which includes a roller-cam assembly having a shaft, a ring rotatably disposed about the shaft, and at least one roller disposed between shaft and ring. The roller is configured such that, upon rotating the ring relative to the shaft, the roller interferes with the ring and the shaft to convert and effect storage of mechanical energy created by the relative rotation of the ring and the shaft. Preferably a plurality of spaced rollers are positioned between ring and shaft. A cam geometry which is symmetrical or asymmetrical is provided on the shaft, the ring, the roller, and combinations thereof. A rotational energy storage device having a back-up ring with alternating thin and thick cross-sectional areas is further provided which is indexed to provide low and high stiffness regions against each roller.

The foregoing and other aspects will become apparent from the following detailed description of the invention when considered in conjunction with accompanying drawing figures.

BRIEF DESCRIPTION OF THE DRAWING FIGURES

DETAILED DESCRIPTION OF THE PREFERRED EMBODIMENTS

Figure 1:
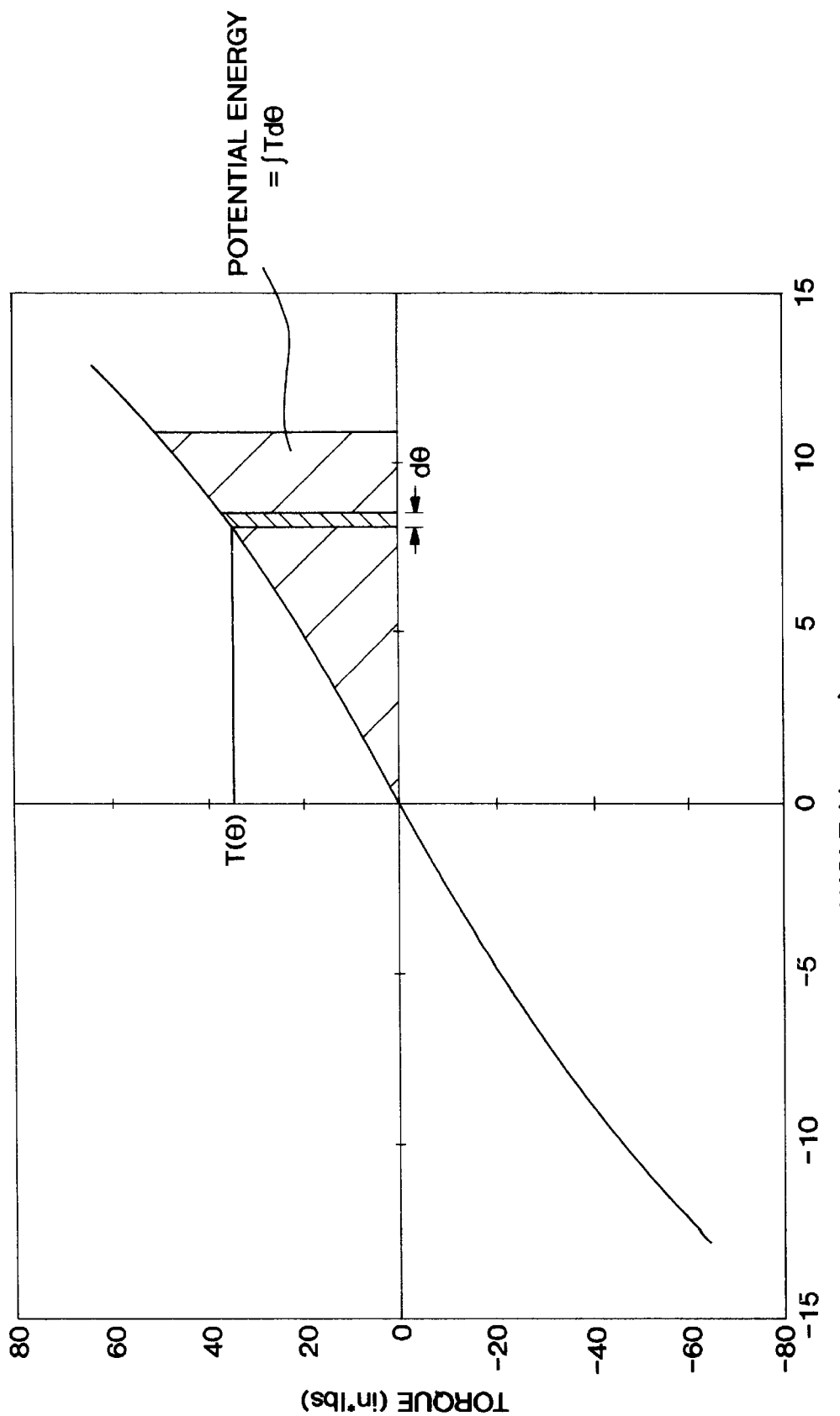
FIG. 1 is a graph showing the torque angle relation for a rotational energy storage device having an elastic behavior.
Figure 2:
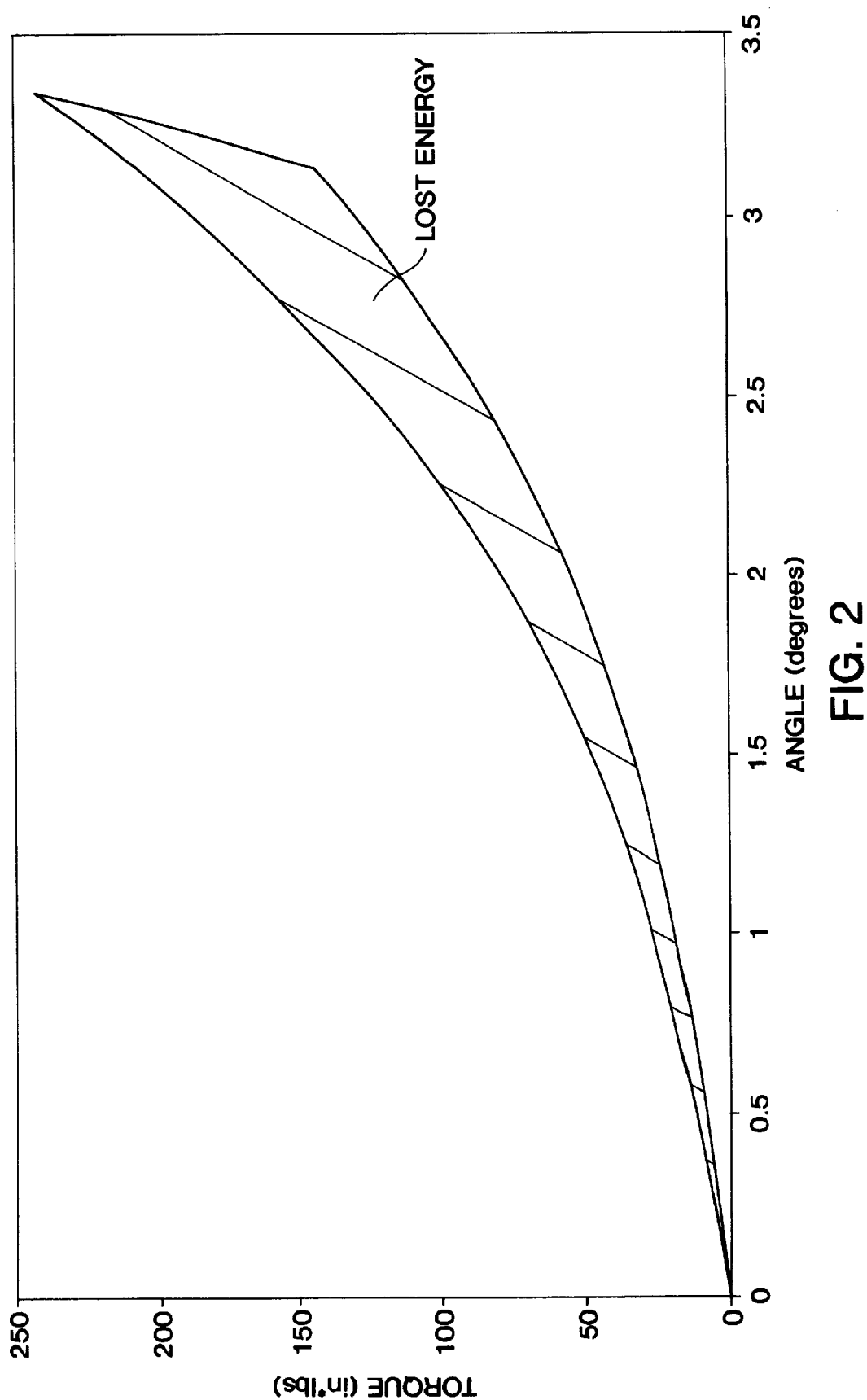
FIG. 2 is a graph showing the torque angle relation for a rotational energy storage device having a "lossy" behavior.
Figure 3:
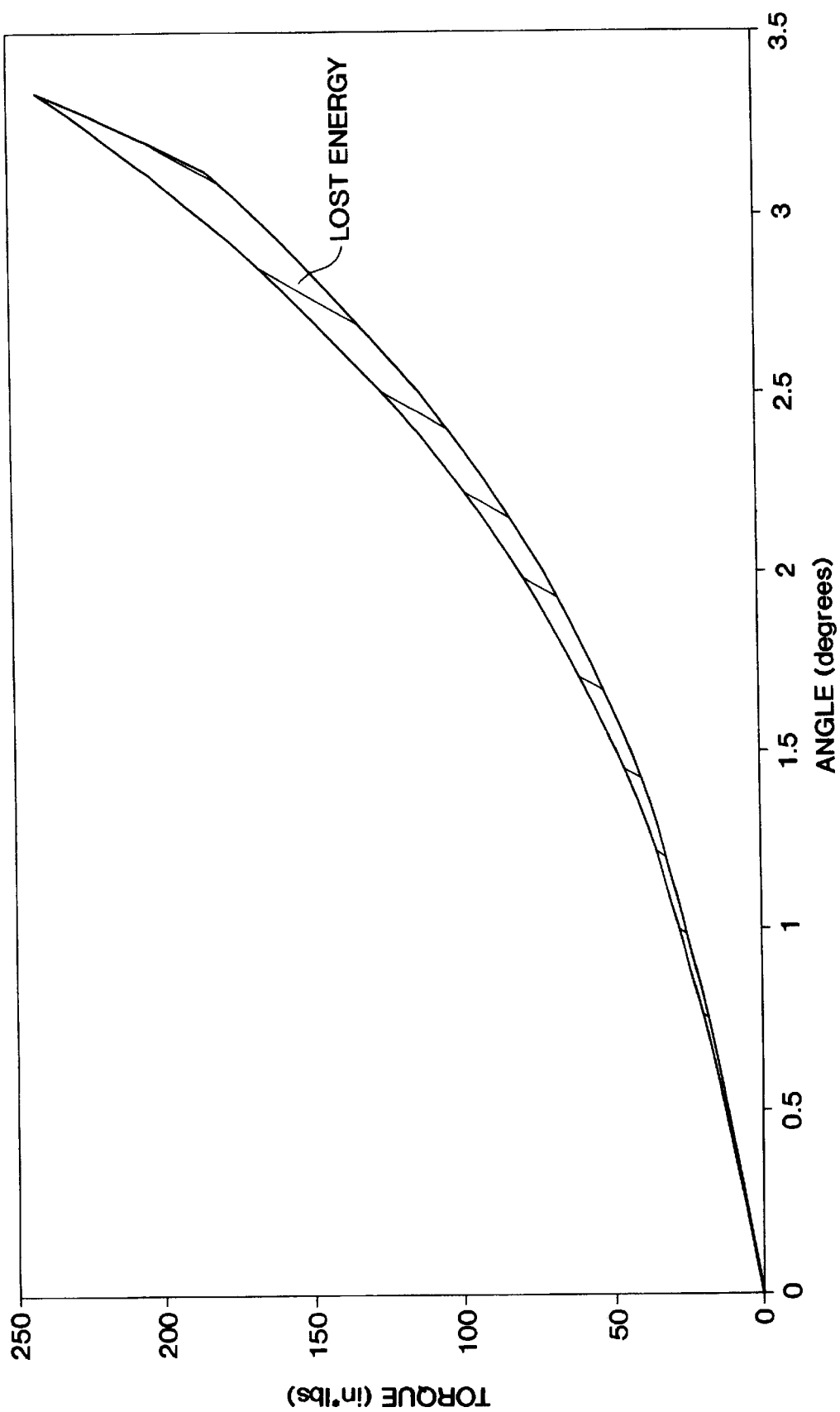
FIG. 3 is a graph showing the torque angle relation for a rotational energy storage device similar to that in FIG. 2 but having lower "lossy" behavior.
Figure 4B:
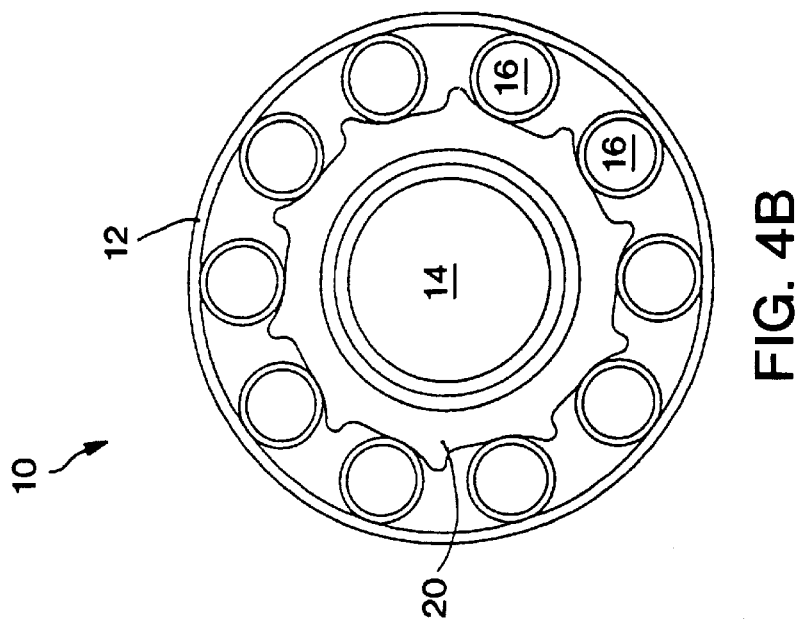
FIG. 4B is a front view of the partially assembled rotational energy storage device shown in FIG. 4A.
Figure 4A:
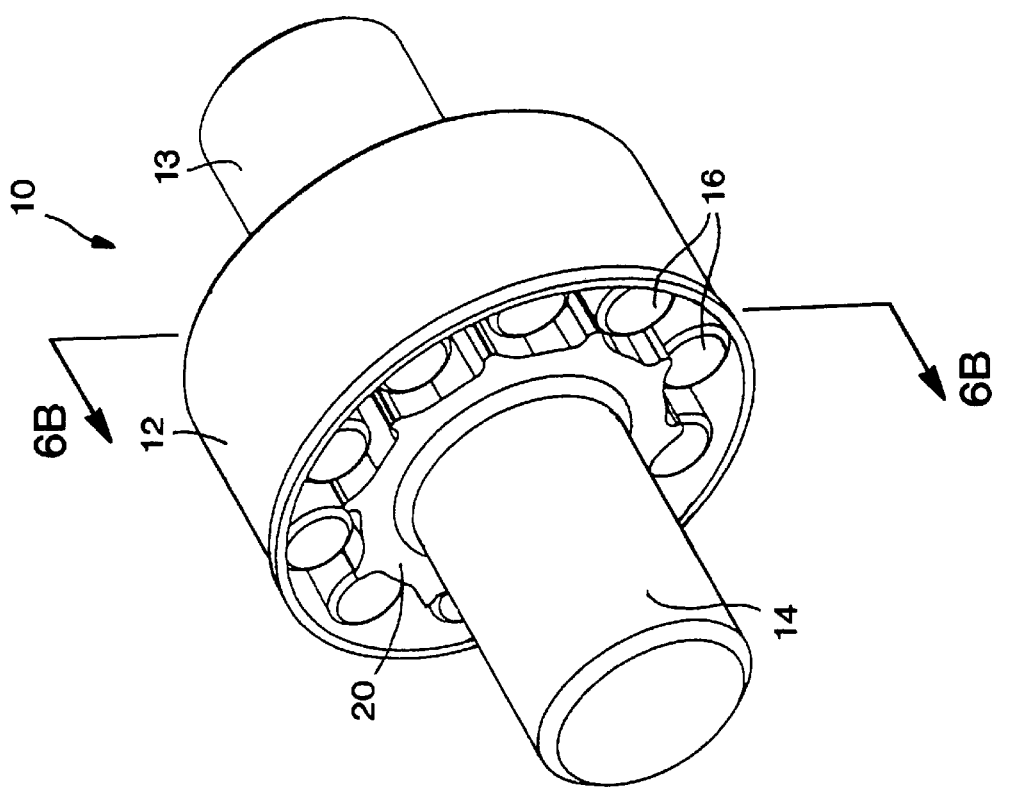
FIG. 4A is an isometric view of a partially assembled rotational energy storage device according to the present invention.

The invention is best understood by reference to the accompanying drawings in which like reference numbers refer to like parts. It is emphasized that, according to common practice, the various dimensions of the parts as shown in the drawings are not to scale and have been enlarged for clarity.

Figure 5B:
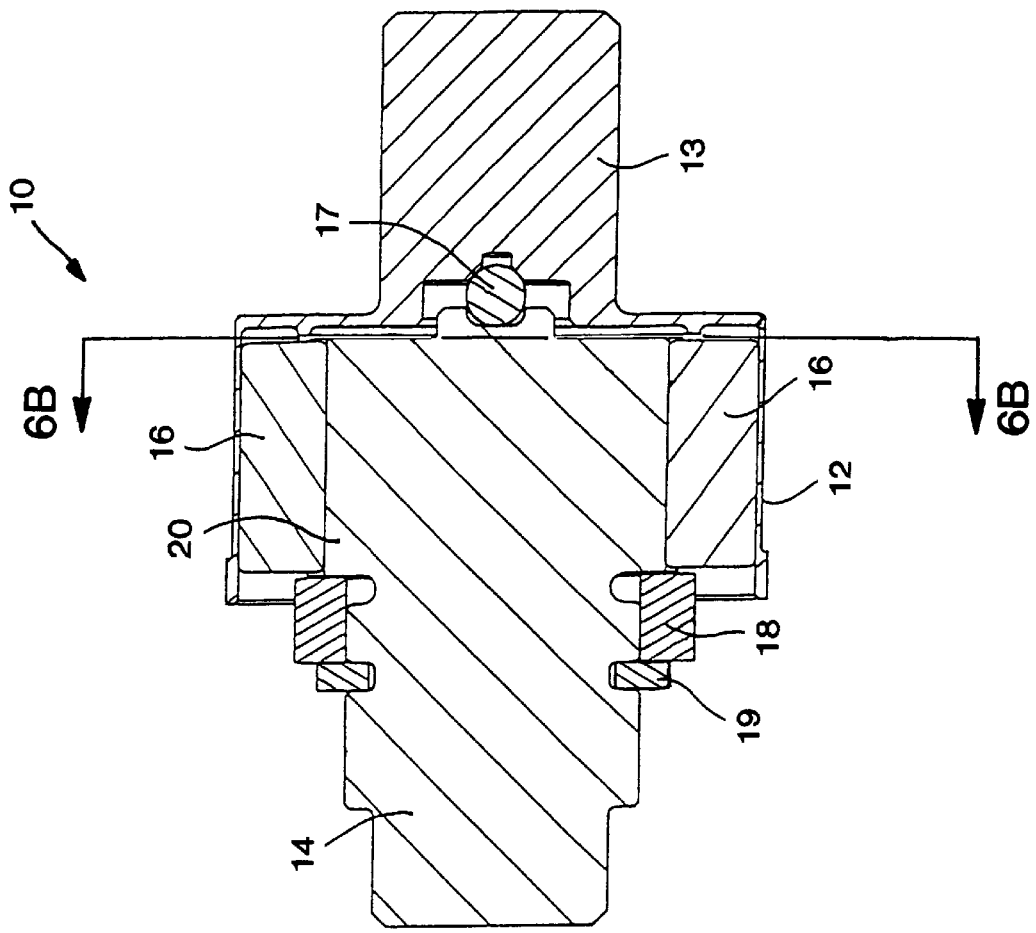
FIG. 5B is an axial sectional view of the rotational energy storage device shown in FIG. 5A taken along the sectional line "5B—5B"
Figure 5A:
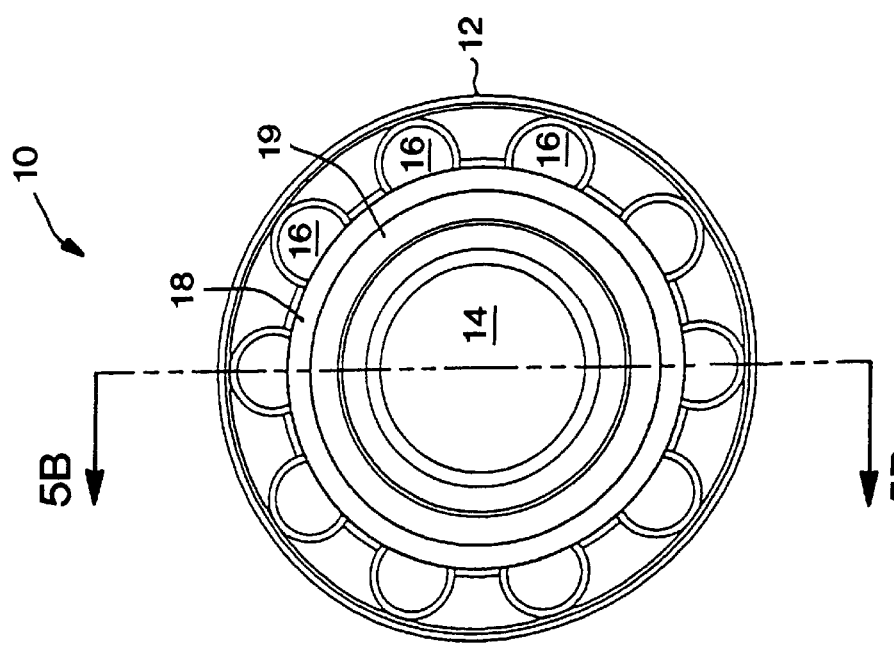
FIG. 5A is a front view of the rotational energy storage device shown in FIGS. 4A and 4B with an annular spacer and retaining ring to maintain assembly of the component parts.

Referring now to the drawings, shown in FIGS. 4A, 4B, 5A, and 5B is rotational energy storage device or spring which, according to a first embodiment of the present invention, is a roller-cam assembly 10 comprising a shaft 14, a ring 12 rotatably disposed about the shaft, and at least one roller 16 disposed between shaft 14 and ring 12. The at least one roller is positioned such that, upon rotating the ring relative to the shaft, the roller interferes with the ring and the shaft to convert and effect storage of mechanical energy created by the relative rotation of the ring and the shaft. Preferably a plurality of spaced rollers 16 are positioned as shown between ring 12 and shaft 14. As can be seen by the partial construction in FIGS. 4A and 4B, shaft 14 is equipped with cam geometry means 20 which is either attached to or integral with the shaft. One end of shaft 14 acts as an input/output interface, as does a shaft member 13 which is attached to, and preferably integral with, ring 12. Rollers 16 are disposed between and contact both the inner diameter of ring 12 and cam geometry 20 of shaft 14, creating two contact zones per roller. A light preload is typically utilized to hold the components in contact by designing the inner diameter of ring 12 to interfere with the rollers, preferably, by press-or shrink-fitting the components of roller-cam assembly 10 together. Construction of roller-cam assembly 10 is typically completed by locating and holding an annular spacer 18 in place on shaft 14 using a retaining ring 19 as shown in FIGS. 5A and 5B. Shaft 14 and shaft member 13 are rotatably mounted with respect to each other by and axially positioned by trust bearing 17 or other suitable means disposed therebetween as shown in FIG. 5B.

Operation of roller-cam assembly 10 will now be described with respect to the three roller-cam positions shown in FIGS. 6A–6C. To simplify the explanation of the operation of a roller-cam device, according to the present invention, a schematic planar view of a roller cam-assembly 10 is shown in these figures as having three rollers 16. Shown in FIG. 6B is roller-cam assembly 10 in which the rollers 16 are at a zero-lift, minimum radial distance from the axis of shaft center.

In operation, upon applying a sufficient large external torque to ring 12 via shaft member 13, ring 12 rotates about shaft 14. Rollers 16, in turn, are caused to roll on the cam geometry 20 of shaft 14 and ring 12 rolls on rollers 16. If no cam geometry existed, the roller-cam assembly 10 would behave in a manner similar to that of a roller bearing. Because of the cam geometry, however, an angular deflection of ring 12 relative to shaft 14 from their positions in FIG. 6B results in a restoring torque which tends to drive the rollers back to their zero-lift positions.

Figure 6C:
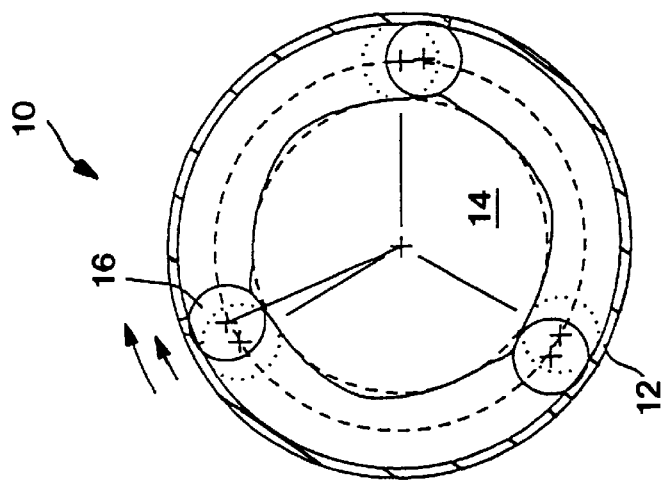
FIG. 6C is a schematic transverse sectional view of the rotational energy storage device shown in FIG. 6B upon clockwise rotation from the zero-lift position.
Figure 6B:
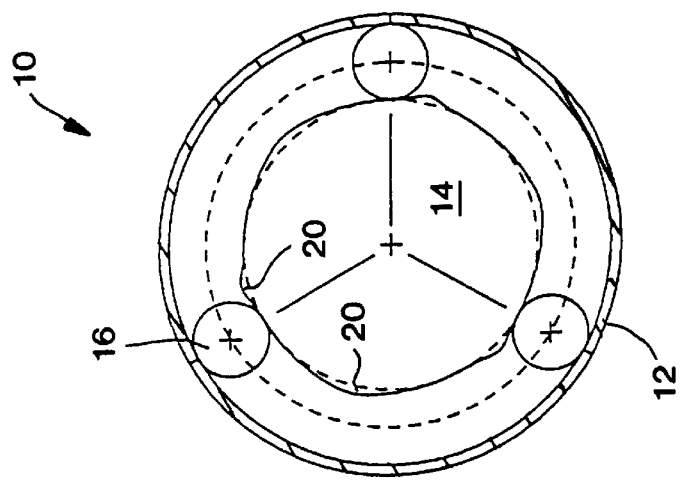
FIG. 6B is a schematic transverse sectional view corresponding to the rotational energy storage device shown in FIG. 4A taken along the sectional line "6B—6B" with three representative rollers at the zero-lift position.
Figure 6A:
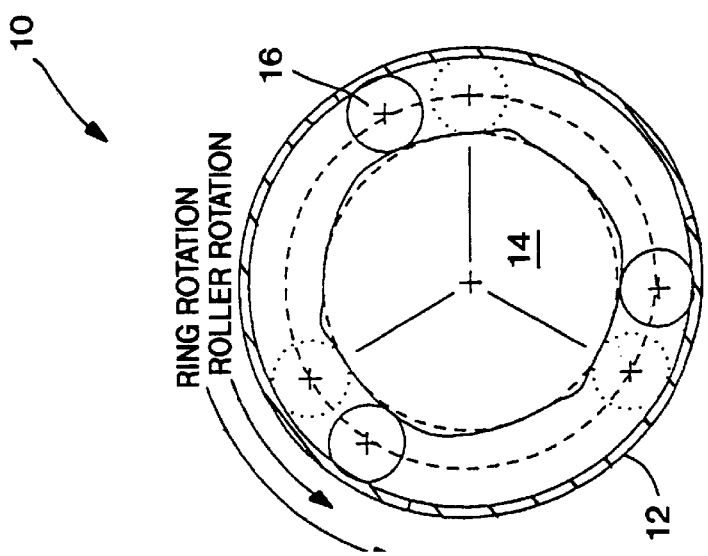
FIG. 6A is a schematic transverse sectional view of the rotational energy storage device shown in FIG. 6B upon counterclockwise rotation from the zero-lift position.

Shown in FIG. 6A is the roller cam assembly upon counterclockwise rotation of ring 12 from the zero-lift position of FIG. 6B while FIG. 6C is the roller cam assembly upon clockwise rotation of ring 12 from the zero-lift position of FIG. 6B. The position of rollers 16 shown in FIGS. 6A and 6C are, respectively, upon the counterclockwise and clockwise rotation to cause an equal degree of radial interference between rollers 16 and ring 12. The dotted outlines shown in FIGS. 6A and 6C show the zero-lift position of rollers 16 to illustrate their relative movement from their former positions in the zero-lift shown in FIG. 6B.

The roller-cam assembly 10 according to the present invention is ideally suited for providing a variety of torque-angle characteristics. In some applications, a symmetrical torque-angular deflection characteristic such as that shown in FIG. 1 is desirable in which the magnitudes of the stiffness profile for the forward and reverse torsioning directions are the same. In other applications, an asymmetrical torque-angular deflection characteristic is desirable in which the magnitudes of the stiffness profile differ in the forward and reverse torsioning directions. Moreover, because the cam geometry may be easily changed, devices having various torque-angle profiles may be designed and easily configured. The cam geometry means shown in FIGS. 6A–6C illustrate an example of one that provides the asymmetrical torque-angle behavior shown in FIG. 9.

Figure 9:
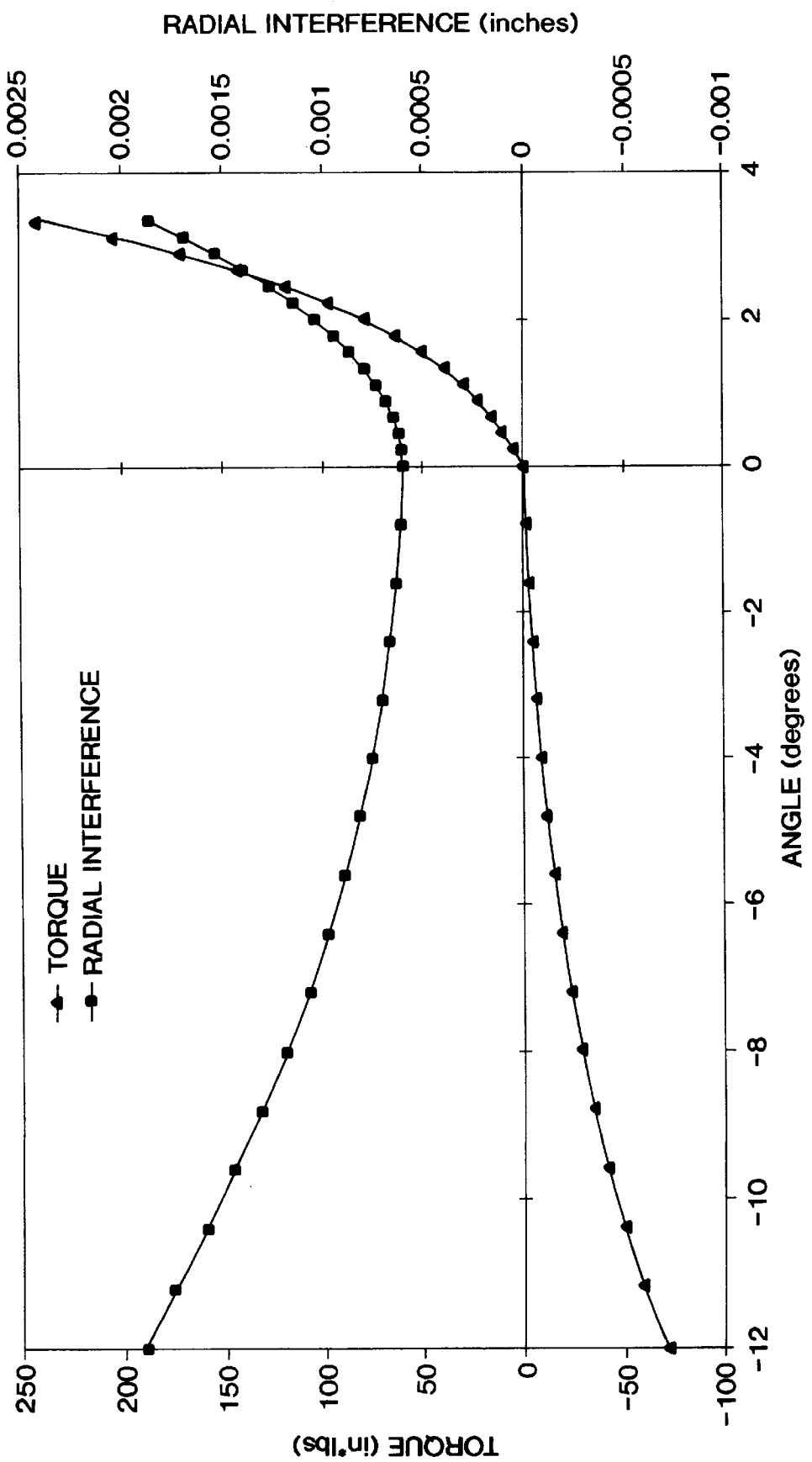
FIG. 9 is a graph showing the torque-angle relationship and radial displacement for the rotational energy storage device shown in FIG. 6B as it is rotated from the zero-lift position to the counter-clockwise and clockwise positions shown in FIGS. 6A and 6C, respectively.

At the origin of FIG. 9 is shown the torque and radial interference when the roller-cam assembly 10 is in the zero-lift roller-cam orientations shown in FIG. 6B. Clockwise motion of the roller-cam assembly into the position shown in FIG. 6C corresponds to a positive angular direction from the origin shown in FIG. 9. Conversely, counterclockwise motion of the roller-cam assembly into the position shown in FIG. 6A corresponds to a negative angular direction from the origin in FIG. 9. Upon inspection of FIG. 9, it can be seen that a given positive angular deflection results in a much greater torque magnitude than does an equal but opposite negative angular deflection.

Figure 8:
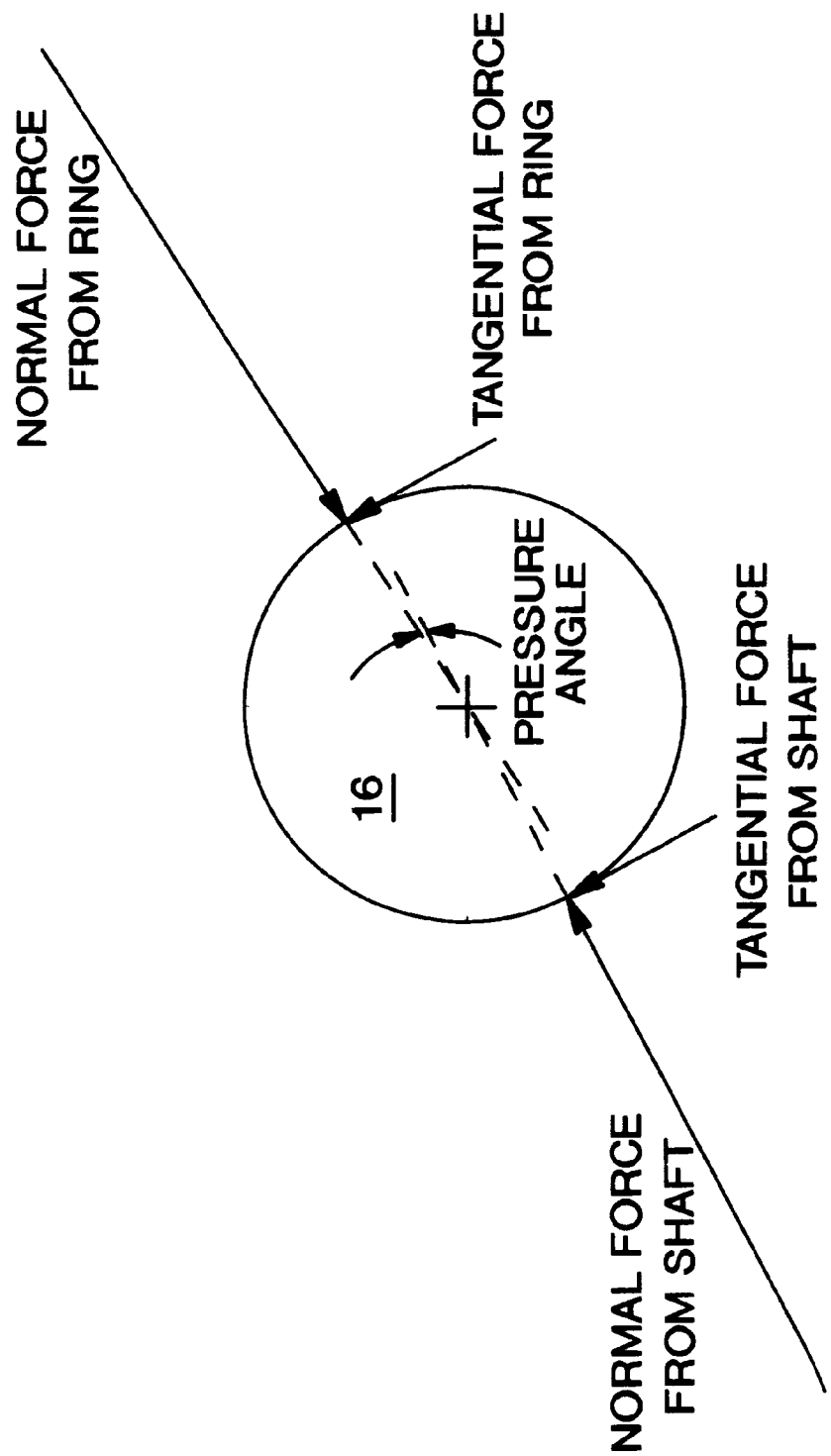
FIG. 8 is a free body diagram illustrating the normal and tangential frictional forces in each of the contact zones exerted on roller by the shaft and ring of the rotational energy storage device shown in FIGS. 4–5 according to the present invention.

Although not intending to be bound to or otherwise limited by any theory, by this construction, the roller-cam assembly acts as a potential energy storage device as follows. As ring 12 driven by shaft 13 rotates as shown in FIG. 6A, rollers 16 orbit shaft 14. The presence of cam geometry 20 on shaft 14 forces rollers 16 to move radially outward creating a greater interference between rollers 16 and ring 12. Because of this interference, as shown in the free body diagrams of FIG. 8, after being deflected through some angle from the zero-lift position, a high normal force and a tangential frictional force are exerted on roller 16 in each of the contact zones with the shaft 14 and ring 12.

Figure 7:
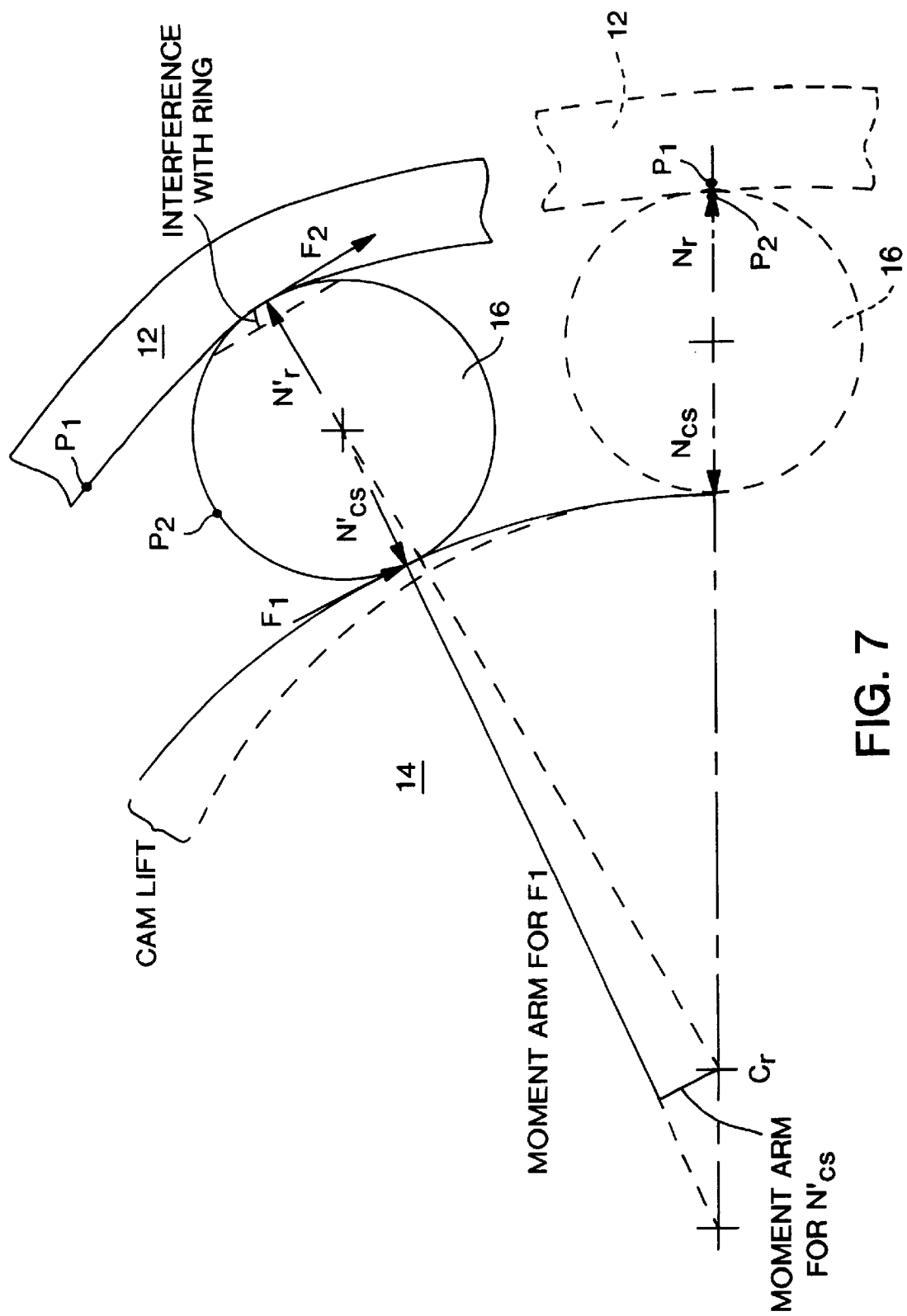
FIG. 7 is a kinematic representation of the interference forces caused in the rotational energy storage device in driving ring counterclockwise from the neutral orientation of FIG. 6B to the position shown in FIG. 6A.

The normal forces created by the interference of the ring and by the cam geometry which are exerted on the rollers, cause equal and opposite forces Nr and Ncs to be exerted on ring 12 and shaft 14, respectively. Shown in FIG. 7 is a kinematic representation of the interference forces exerted on the ring 12 and shaft 14 caused by roller 16 in driving ring 12 counterclockwise from the neutral orientation of FIG. 6B (represented by dashed lines with relative positions of roller 16 and ring 12 indicated with marker points P1 and P2, respectively) to the orientation of FIG. 6A (shown in solid lines with marker points P1 and P2, respectively, indicating subsequent relative positions of roller 16 and ring 12). In moving to the orientation shown in FIG. 6A, the greater interference caused by roller 16 forces the ring 12 to expand as shown in FIG. 7 thereby storing potential energy. Additional storage of potential energy is caused by the compression of rollers 16 and shaft 14 which also occurs.

Thus, applying a torque to shaft 13 results in an angular deflection of the ring about the shaft 14. At each angularly deflected position, a restoring torque exists. As illustrated in FIG. 1, the integral of the torque applied through the angle of rotation about shaft 14 is equal to the work done on the roller cam spring in deforming it. Energy, defined as the capacity to do work, resides in the spring, and may be released by reducing the torque applied to the shaft. As the torque applied is reduced, the roller cam tends to return to its zero-lift position, and the energy stored in the spring is released as the roller cam performs work on shaft 13.

In greater detail, although not intending to be bound to or otherwise limited by any theory, roller-cam assembly 10 acts as a potential energy storage device in the following manner. As shown in FIG. 7, as the roller moves up the cam away from the zero-lift position, although the normal forces Nr and Ncs are equal in magnitude the direction of the normal force Ncs' acting on the cam geometry of shaft 14 shifts so that it no longer passes through the center of rotation of the shaft 14. As a result, a moment is exerted by this normal force Ncs' on shaft 14 which combines with the moment caused by the tangential frictional force F1 to create a resultant torque on shaft 14. In order to maintain equilibrium of the roller, a tangential frictional force F2 must exist between each roller 16 and ring 12. The sum of all of these tangential frictional forces F2 acting at each of the roller/ring interfaces at a moment arm equal to the radial distance from the center of shaft rotation Cr, result in a restoring torque on the ring 12. Thus, the torque exerted on ring 12 at any deflected position depends on the normal and tangential forces with the normal force depending mainly on the radial interference between the roller and the ring caused by the cam geometry.

Moreover, although it is envisioned that the storage of potential energy discussed above may be accomplished by providing cam geometry that is symmetrical with respect to the zero-lift position, for various applications such as those discussed in detail below an asymmetrical cam geometry may be desirable to provide differing torque angle characteristics in each direction. If such an asymmetrical cam geometry such as that shown in FIGS. 6A–6C is provided, if ring 12 driven by shaft 13 is rotated in the opposite rotational (i.e, clockwise) direction shown in FIG. 6C, roller 16 is moved along a more rapidly rising cam geometry. In FIG. 6C, a significantly smaller angle has been required to obtain the same radial interference as that obtained in FIG. 6A and the pressure angle (i.e., the angle between a normal to the contact point between the roller and the shaft and a radial line extending from the center of rotation, Cr, to the center of the roller) is greater. Although the equal radial interferences in each direction results in equal normal forces being exerted in the contact zones with the roller, the greater pressure angle of the cam geometry in the clockwise direction requires higher tangential frictional forces to maintain equilibrium of the roller. As a result, these higher tangential frictional forces acting at each roller/ring interface result in a higher restoring torque when moving ring 12 from the zero-lift position in the clockwise direction than in the counterclockwise direction.

Hence by providing a cam geometry which is asymmetrical about the zero-lift position, that is, one in which the cam rise and rate of rise differ depending on rotation direction, a torque-angle characteristic may be produced that varies significantly depending on direction. This, in turn, permits the storage or release of approximately equivalent amounts of potential energy with differing levels of restoring torque by tailoring the cam geometry as discussed above. It is important to note that the transition from counter-clockwise to clockwise rotation occurs smoothly without loss of contact between the components, and is therefore much quieter than other schemes that rely on breaking contact to change the torque-angle relationship.

Preferably, to prevent loss of energy in the system, the cam geometry described above is designed so that the pressure angles developed between each roller 16 and the shaft 14 during relative rotation are small enough to prevent slipping. This design provides rolling action between the rollers 16 relative to shaft 14. Alternatively, a cam geometry which permits slipping between the rollers 16 relative to shaft 14 may be employed to provide a torque-limiting feature or to otherwise create "lossy" behavior described further in detail below.

While the embodiment incorporating the principles discussed above has great utility, variations that provide the ability to tailor the design torque-angle characteristics for various applications may also be incorporated. For instance, the rollers and the shaft, which also undergo deflection as the rollers rise radially, can be modified in applications where the ring 12 is constrained from flexing or cannot be made as flexible as the one considered in FIG. 6. This may be accomplished, for example, by utilizing a hollow shaft which flexes such as that shown in FIGS. 15A and 15B, which embodiment is described in greater detail below. Alternatively or additionally hollow rollers may be utilized for this purpose.

Alternative Cam Geometry Embodiments

Moreover, although shown and described above with respect to a roller-cam assembly 10 having cam geometry only disposed externally along shaft 14 in an axial direction, it will be readily recognized that alternative embodiments may be provided by equipping any of the three interacting components, i.e., shaft 13, rollers 16, ring 12, or combinations thereof with cam geometry which is symmetrical or asymmetrical.

A. Sprag Cam Geometry

Figure 10C:
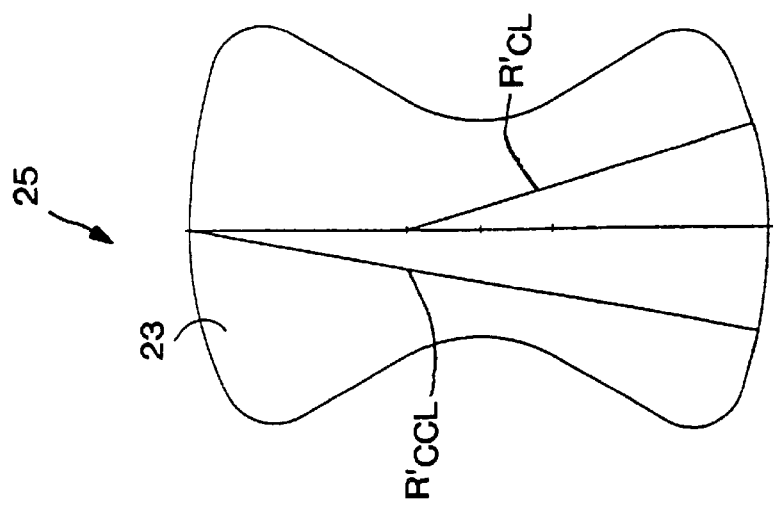
FIG. 10C is an enlarged view of an alternative sprag geometry which may be incorporated into the rotational energy storage device shown in FIG. 10A to provide an asymmetrical torque-angle characteristic.
Figure 10B:
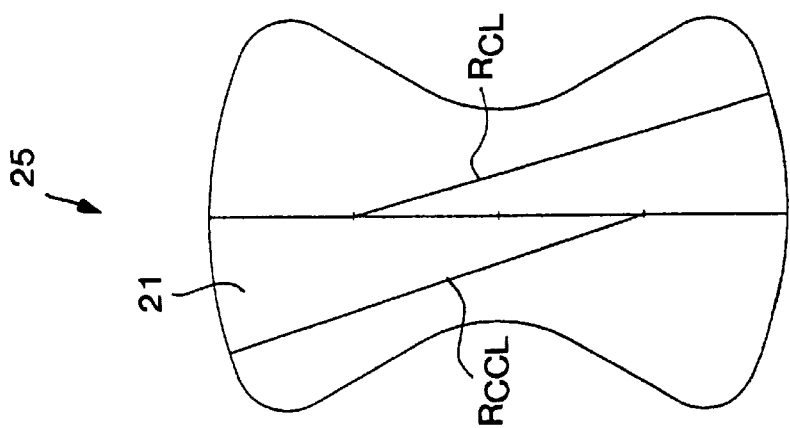
FIG. 10B is an enlarged view of the sprag geometry shown in FIG. 10A which provides a symmetrical torque-angle characteristic.
Figure 10A:
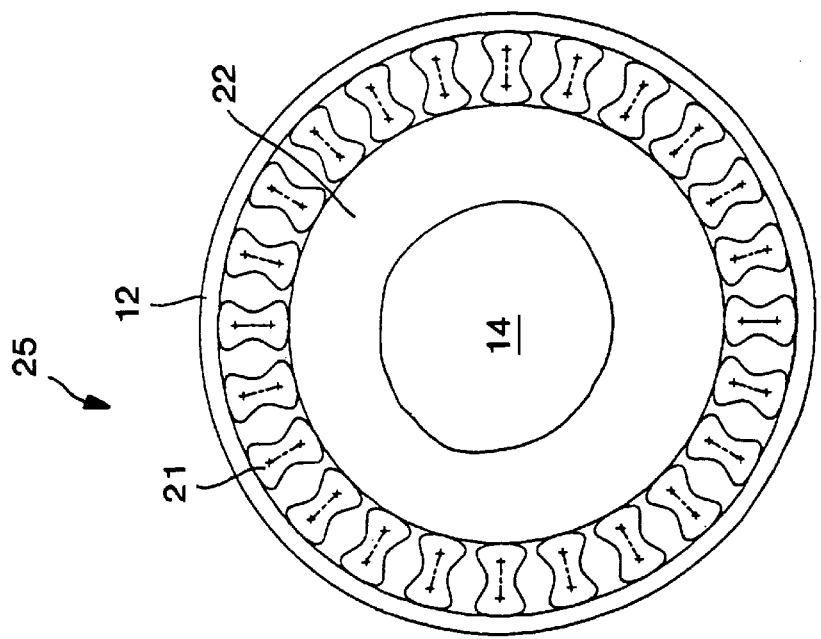
FIGS. 10A is an end view of an alternative embodiment of a rotational energy storage device according to the present invention having rollers with sprag geometries.
Figure 10D:
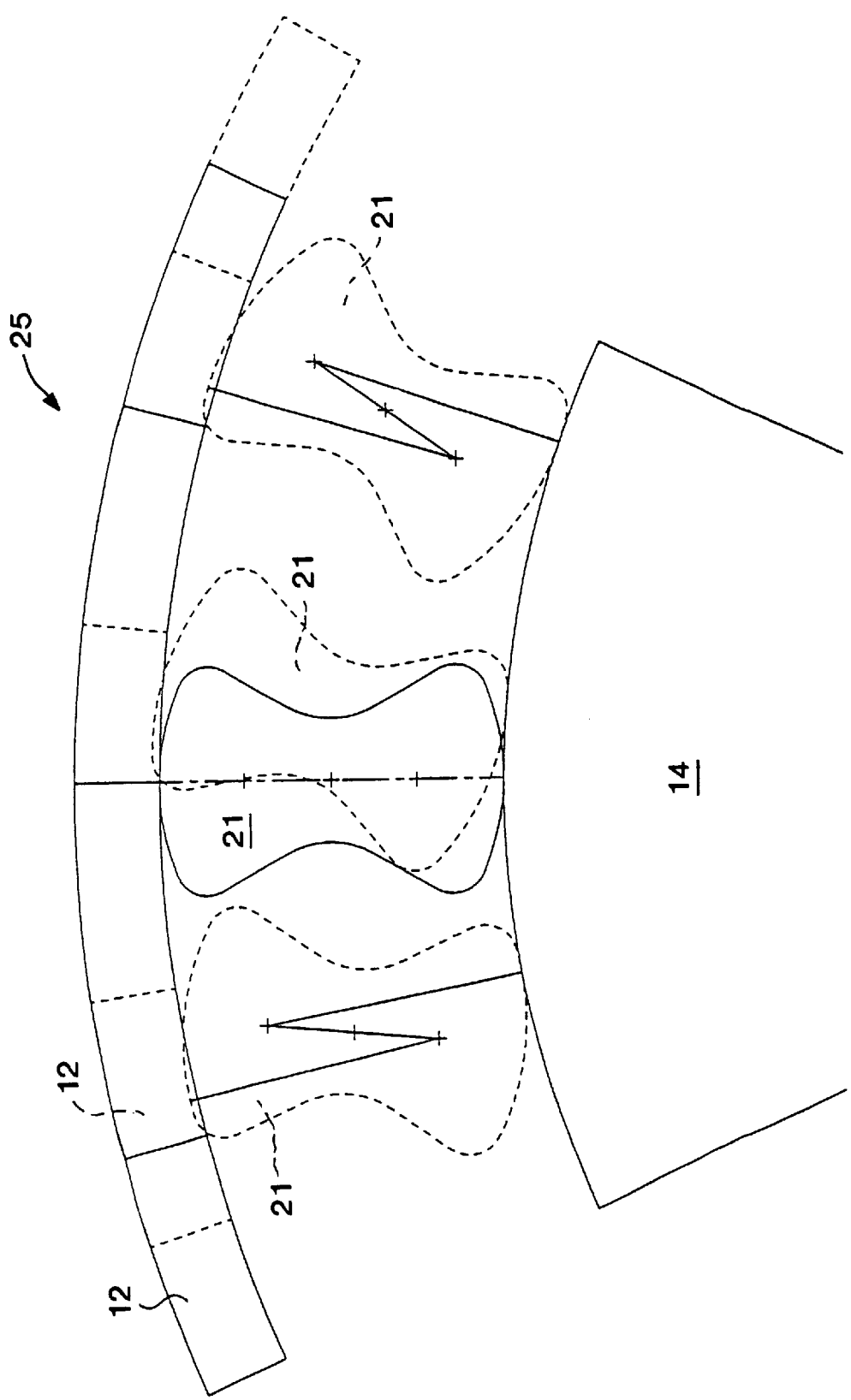
FIG. 10D is a partial view of the rotational energy storage device in FIG. 10A rotated in a clockwise direction.

Shown in FIGS. 10A–D is an alternative embodiment in which the cam geometry is provided as a sprag geometry on the rollers. Shown in FIG. 10B are sprags 21 having radii of curvature which are equal in the clockwise (Rcl) and counterclockwise (Rccl) directions. By mating sprags 21 between ring 12 which acts as an outer race and a circular inner race 22 mounted on shaft 14 as shown in FIG. 10A, a roller cam assembly 25 may be provided which has a symmetrical torque-angle characteristic. Shown in FIG. 10D is a portion of the roller cam assembly 25 depicted in FIG. 10A upon a clockwise rotation of ring 12. The dashed sprag bodies are provided to represent the position of the sprags 21 after ring 12 has been rotated through a small clockwise angle, as shown by the dashed extension of the ring. Interference can be detected between each sprag body and the ring. These interferences cause high normal forces, resulting in tangential frictional forces which maintain equilibrium. These tangential frictional forces, acting at a distance from the center of rotation, provide restoring torques as discussed in detail above. Shown in FIG. 10C is an alternative sprag 23 configuration in which the radii of curvature are not equal in the clockwise (Rcl') and counterclockwise (Rccl') directions. A roller-cam assembly 25 having an asymmetrical behavior may also be provided by replacing sprags 21 with sprags 23 thereby providing different radii which are active in each of the clockwise and counterclockwise directions (shown as Rcl and Rccl, respectively) depending on which direction ring 12 is rotated from the zero lift position. Thus the operation of the sprag-based roller cam assembly 25 is similar in nature to the behavior discussed in relation to the roller-cam assembly 10 shown in FIG. 6 and described in detail above.

The sprags useful in the present invention are similar to those used in overrunning clutches as is known in the art. Examples of such sprags are those manufactured by the Formsprag Company, Warren, Mich. Although such sprags operate in overrunning clutches to permit rotating members to run freely relative to one another by slipping in one rotational direction while locking the members together in the other rotational direction they differ in their operation in the roller cam according to the present invention by transmitting torque in both rotational directions and allowing no free running.

B. Ring Curvature, "Zero-Net Pressure Angle"

Figure 11B:
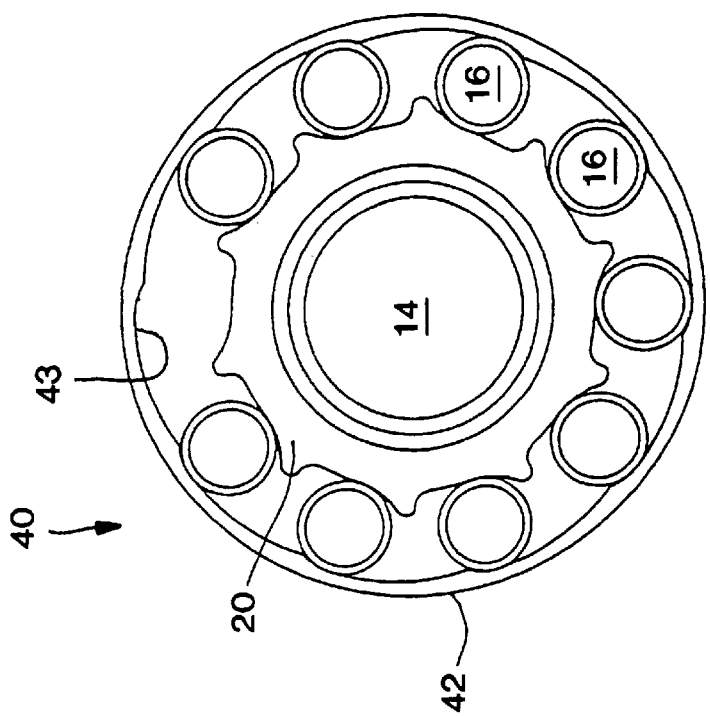
FIG. 11B is a front view of the partially assembled rotational energy storage device shown in FIG. 11A with a roller removed to show a cam geometry on an interior ring surface.
Figure 11A:
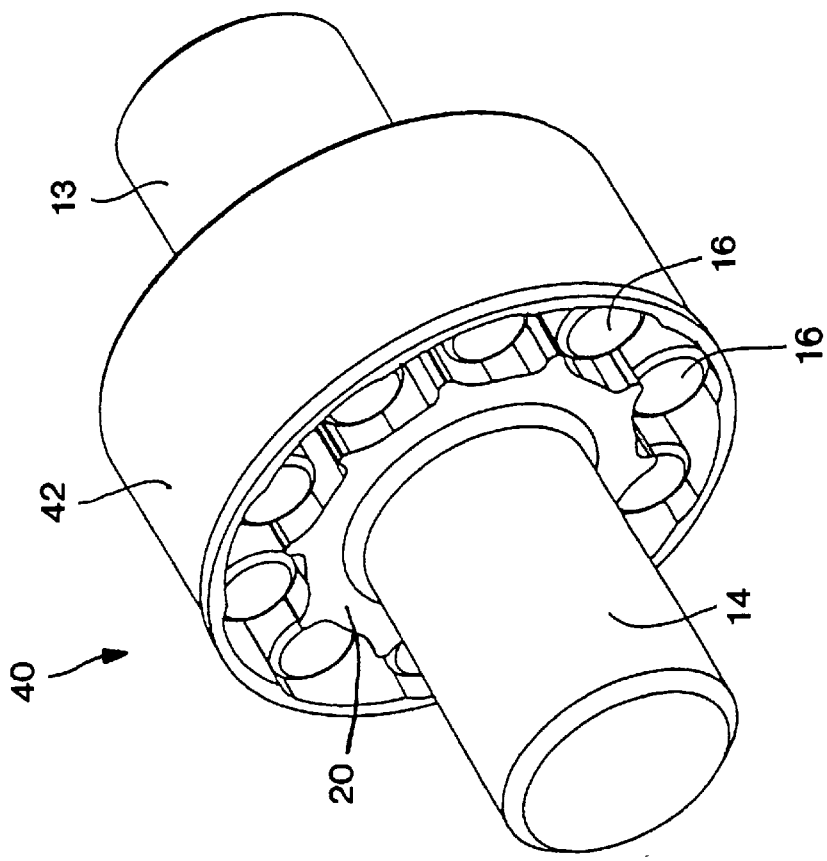
FIG. 11A is an isometric view of a partially assembled rotational energy storage device according to another embodiment of the present invention.

Shown in FIGS. 11A and 11B is another embodiment of a roller-cam assembly 40 in which cam geometry means is provided as a cam geometry 43 on the interior surface of ring 42. Cam geometry 43 may be used as the sole cam geometry means or in combination with other cam geometries. For example, by providing both cam geometry 43 on ring 42 and cam geometry 20 on shaft 14, as shown, the torque-angle relationship may be controlled to realize a beneficial result; the "net pressure angle" can be kept very close to zero across the range of motion of the roller. While the pressure angle between the roller and the cam on the shaft remains, a new pressure angle is introduced at the ring/roller interface which can be designed such that the normal forces acting on the roller are effectively directly opposed. As a result the dislodging effect on the rollers is greatly reduced thereby providing a robust design under varying lubricating conditions. In this manner the range of materials which may be employed to construct roller-cam assembly 40 is increased thereby providing greater design flexibility.

C. Back-Up Ring Configuration

Figure 12:
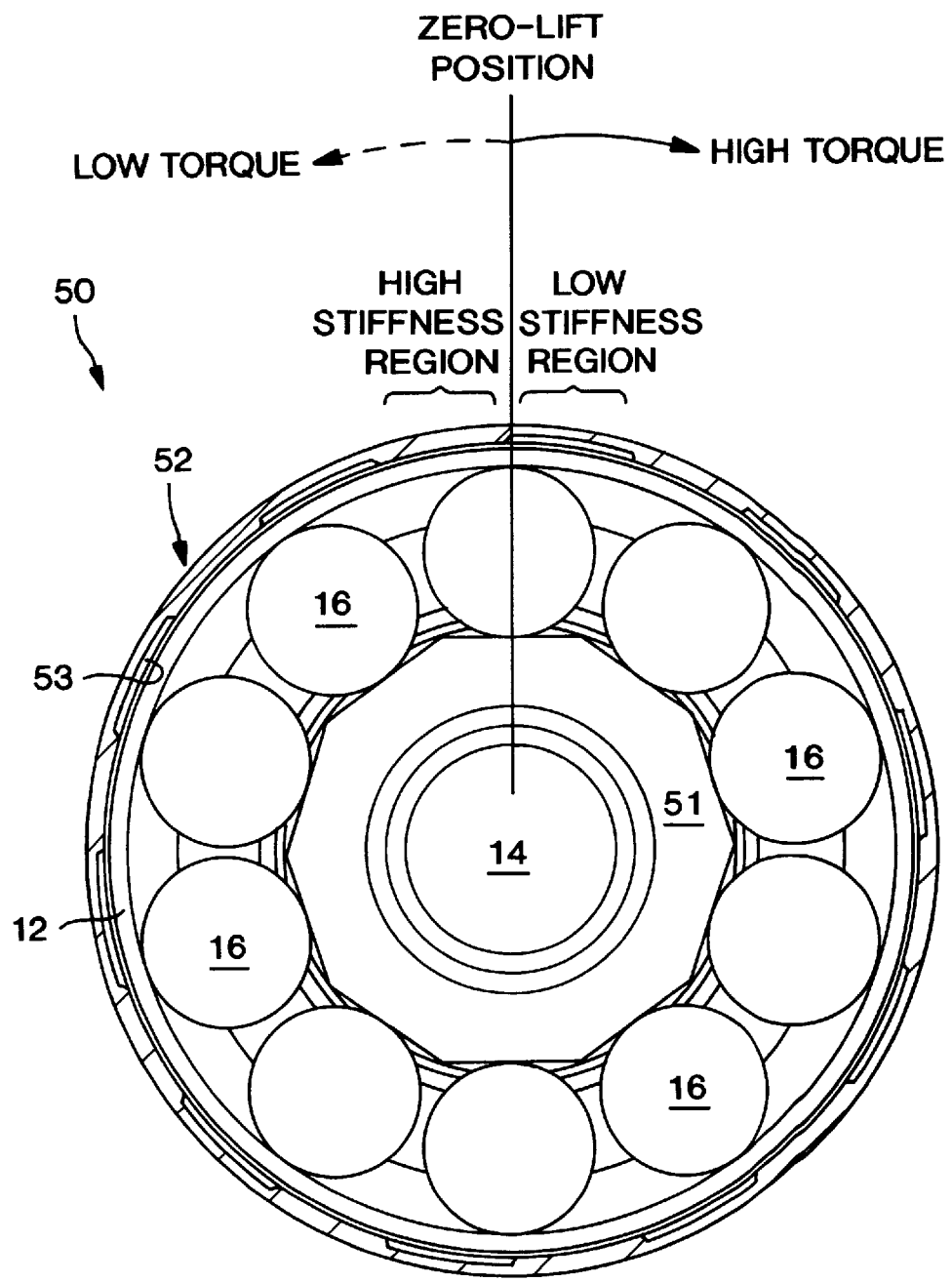
FIG. 12 is an end view of an alternative embodiment of a rotational energy storage device according to the present invention having a pocketed back-up ring.

In yet another embodiment, the mechanism torque-angle behavior can be modified by use of a back-up ring 52 which is concentrically located about and contacts ring 12 of a roller-cam assembly 50, and can be rotated relative to it. The back-up ring 52 includes pockets 53 which are oriented relative to cam geometry 51 to vary the deformation of ring 12 as described below. Shown in FIG. 12 is such a configuration having a roller-cam assembly 50 which is similar to the roller cam assembly 10 described above except that shaft 14 incorporates a symmetrical cam geometry 51 on both sides of each of a plurality of equally spaced zero lift positions. Also provided around ring 12 is a concentric back-up ring 52 which is in light radial contact with ring 12. Concentric back-up ring 52 is provided with a plurality of pockets or reliefs 53 on the inner diameter to provide thick and thin wall thicknesses which are indexed to define alternating high stiffness regions and low stiffness regions which, in turn, provide greater tightening torque than loosening torque, respectively. As discussed in greater detail below, the ability to rotate the pocketed back-up ring 53 relative to the ring 12 allows the torque-angle relation to be modified and reversed.

Figure 15B:
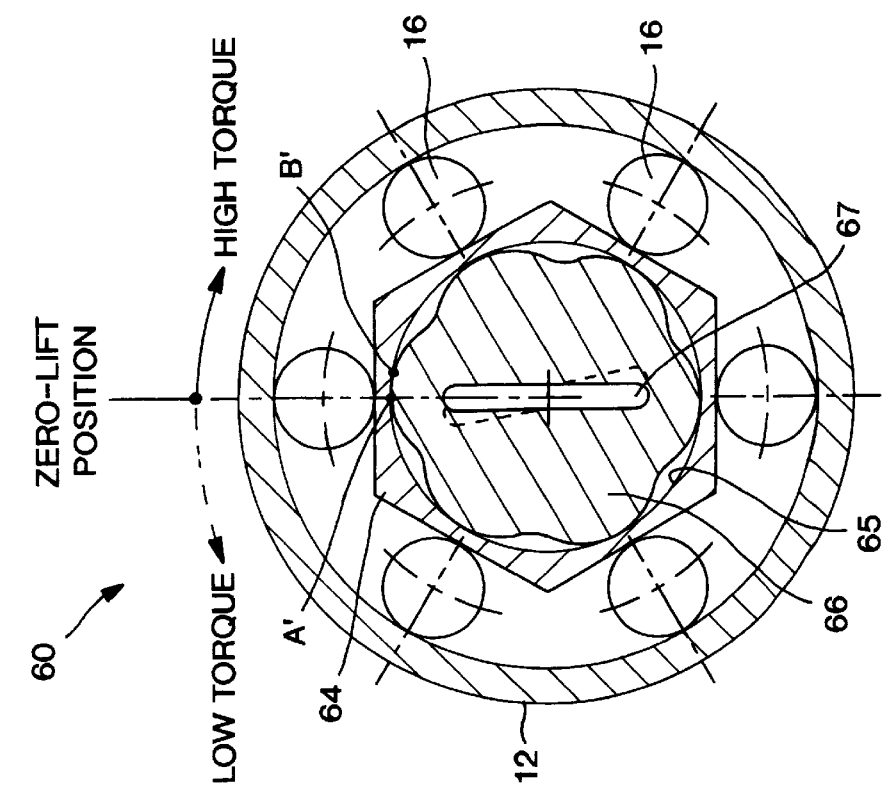
FIGS. 15A and 15B are transverse sectional views of an embodiment of a rotational energy storage device according to the present invention which is reversible.
Figure 15A:
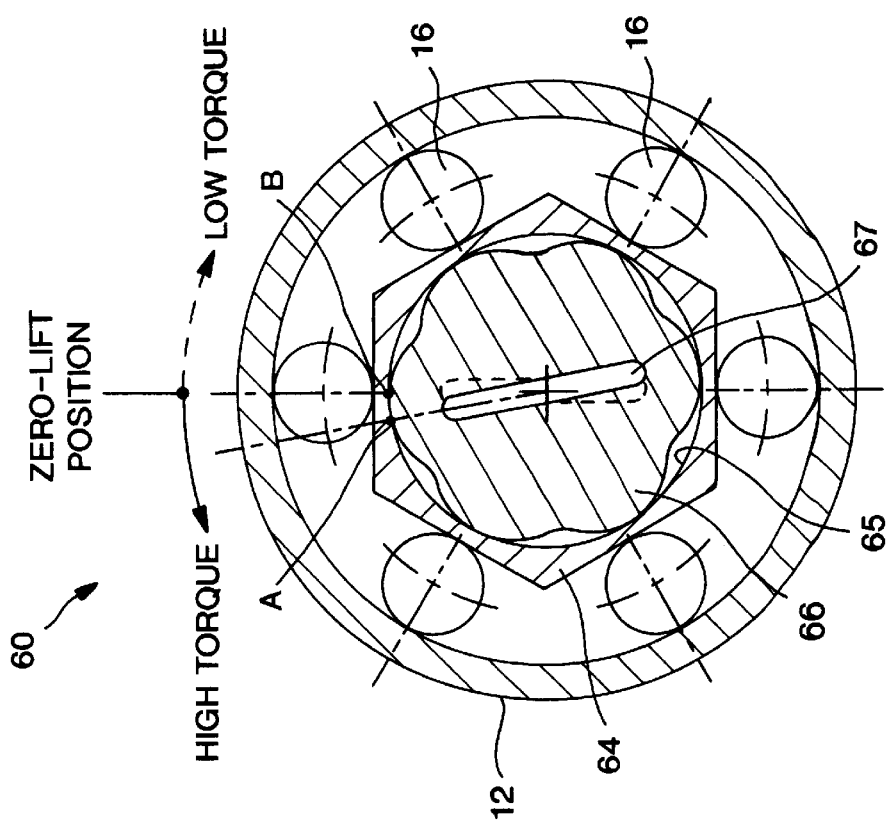

It will be readily recognized by those skilled in the art upon reading the instant disclosure that similar behavior can be achieved by other means which provide high and low stiffness regions, for example, by providing a pocketed internal shaft as shown in FIGS. 15A and 15B or by providing pockets in the main internal shaft that can be essentially empty or full of supporting material to provide the high stiffness and low stiffness behavior discussed above.

Having described in detail the construction and operation of a roller-cam device according to the present invention, various applications where such a device is particularly useful will be readily recognized by those skilled in the art. For example, the roller-cam device according to the present invention may be incorporated into a resonant reactionless torquing tool. The flexibility of design with regard to the torque-angle relationship provided by the roller-cam assembly, including its ability to provide much greater torsional stiffness in one direction than the other, makes it an ideal mechanism for such a tool. When excited to resonance, the roller-cam assembly would convert kinetic energy to potential energy in a much smaller angle in one direction than the other, thus developing much higher torque in that direction. As a result, a fastener to be tightened is rotated in the high-torque direction, but does not back up under the lower torque developed in the opposite direction. The resonant system requires low loss in order to achieve high gain—the rolling (as opposed to sliding) elements of the roller-cam assembly of the present invention may be used to provide this; thus a relatively small motor can be used to develop high torque. The smooth rolling transition between soft and stiff behavior of the roller-cam assembly would also provide a tool which is more quiet in operation, a trait which is especially desirable for tools which are to be used for extended periods of time.

Figure 13:
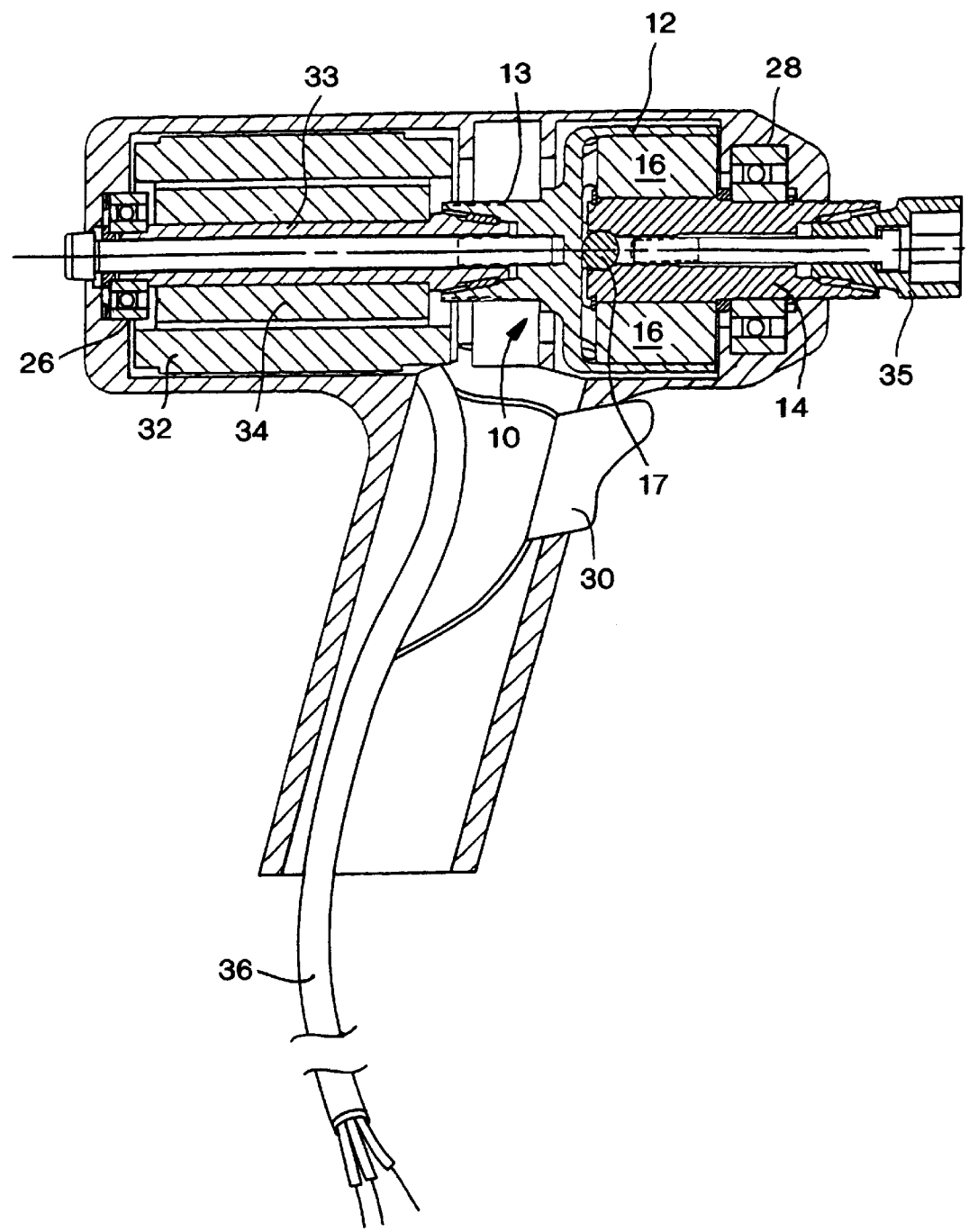
FIG. 13 is a cross-sectional view of an oscillating mass-based tool which incorporates a roller-cam assembly according to the present invention.

It is envisioned that the roller-cam assembly according to the present invention may be adapted to couple shaft member 13 directly to the rotor of a DC motor such as the flywheel rotor 4 shown in FIG. 1 in the allowed '043 application described above. Shown in FIG. 13 is a schematic representation of an example of an oscillating mass-based tool which incorporates one embodiment of the roller-cam assembly of the present invention. In such a configuration, the roller-cam assembly 10 would replace the dual-stiffness spring of the rotating spring-mass oscillator of the '043 application, with the roller-cam ring 12 and the rotor 34 acting as the oscillating mass. As shown in FIG. 13, shaft member 14 is rigidly engaged for rotation with spindle 33 driven by rotor 34. Shaft 14 of roller cam assembly 10 would be configured to interface with a socket 35 for tightening threaded fasteners which as shown in FIG. 1 of the '043 application may be a collet type socket or other clamping means.

By supplying energy from the motor in phase with the rotor's velocity, the rotor is oscillated in a resonant or near-resonant mode. The rotor reaches peak velocity at the zero lift position of the roller cam, as shown in FIG. 6B. At this point, the rotor and the ring 12, which is directly coupled to it, are rotating rapidly about shaft 14. A great amount of kinetic energy is stored in them by virtue of their rotational mass moment of inertia and their angular velocity. As the roller cam is deflected from the zero lift position, the restoring torque which is a function of cam geometry and forces due to interference, begins to rise. This torque acts to negatively accelerate the rotor/ring inertia; the rotor/ring inertia performs work on the roller cam spring, and the kinetic energy from the inertia is converted to potential energy in the roller cam. As the roller cam continues to rotate, the restoring torque continues to negatively accelerate the rotor/ring inertia until it brings this inertia to a stop, and a great amount of potential energy is stored in the roller cam. The restoring torque which has stopped the motion of the rotor/ring inertia now begins to accelerate them in the opposite direction, and the potential energy in the roller cam is returned to kinetic energy in the rotor/ring inertia. Because of the asymmetry of the cam profile about the zero lift position, upon rotating ring 12 in a clockwise direction to the position shown in FIG. 6C, the roller cam is able to stop the rotor/ring inertia in a shorter rotation angle and a shorter time such that a higher restoring torque is developed.

When the restoring torque developed in the high torque direction is greater than that required to move a fastener, equilibrium of shaft 14 can no longer be maintained, and the torque acting on it begins to accelerate it in the clockwise direction, delivering energy to the fastener. In other words, when the fastener can no longer resist the torque generated, it begins to advance in the direction in which the torque is applied. As the shaft accelerates, depending on the angular momentum remaining in the rotor/ring inertia, the rollers may continue to climb the cam or the shaft may rotate quickly enough so that the rollers are "left behind", rolling back to the zero lift position, having a negative angular velocity relative to the shaft. When the fastener has stopped moving, the potential energy remaining in the roller cam will be returned to the rotor/ring, accelerating them in the counterclockwise direction. The motor continues to drive the rotor/ring in phase with their angular velocity, and energy continues to be delivered to the oscillator. Ideally, the torque developed in shaft 14 during a counterclockwise rotation from the zero lift position is not great enough to rotate the fastener counterclockwise, and it will be rotated forward again when high torque is encountered on a relative clockwise rotation of the ring.

Thus, the roller-cam assembly according to the present invention may be used as a rotational spring-inertia oscillator having a torque angle characteristic that varies depending on direction of rotation such that a higher torque is provided in one rotational direction than the other (i.e., by incorporating an asymmetrical cam geometry such as that provided in FIGS. 6). The higher torque direction can be use to tighten a threaded fastener. Moreover, the roller-cam assembly 10 according to the present invention may be used as a rotational spring-inertia oscillator which is "DC biased" (i.e., by incorporating a symmetrical cam geometry to provide a non-zero mean torque using a D.C. pulse motor as described in the allowed '037 application).

In either case, the roller-cam assembly according to the present invention could use a motor with a lower torque output than that required to tighten the threaded fastener. This is accomplished by using the motor to drive the rotational spring-inertia oscillator in phase with rotor velocity such that the power input to the system is always positive.

The resulting angular deflections of the system and the angular velocity of the rotor would continue to grow until the torque developed in the output shaft is sufficient to overcome the fastener torque, at which time the fastener is rotated forward through some angle. Energy is built up again in the oscillator until the new level of torque in the fastener is overcome, at which point the fastener is tightened further.

As a result, it is expected that by such a construction, a portable tool which is both lightweight and has a relatively small package size may be achieved by using a smaller output torque motor while still providing a tool having a high output and high torque capacity. Although shown and discussed above with operating components such as a front support bearing 28, a rear support bearing 26, a motor stator 32, a trigger switch 30, and a power control cable 36, these components are provided to show a preferred mode of incorporating the roller cam assembly into an oscillating mass-based torquing tool. Other components of construction generally understood with respect to the basic operation of such a tool will be readily recognized by those having ordinary skill in the art and are therefor not shown for reasons of clarity.

Figure 14B:
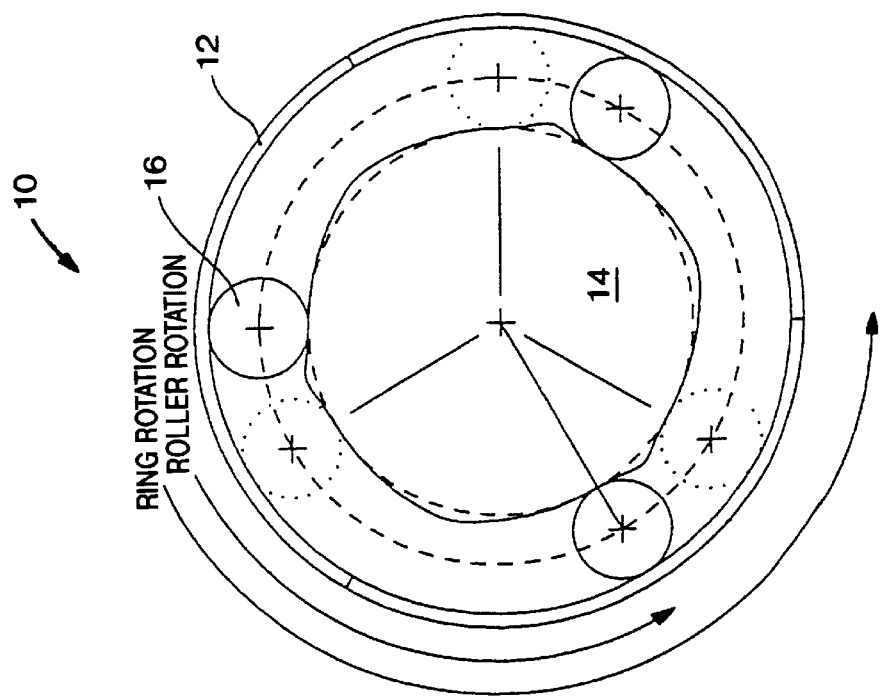
FIGS. 14A and 14B are schematic end views illustrating a cam geometry for reversing the torque-angle relationship of a rotational energy storage device according to the present invention.
Figure 14A:
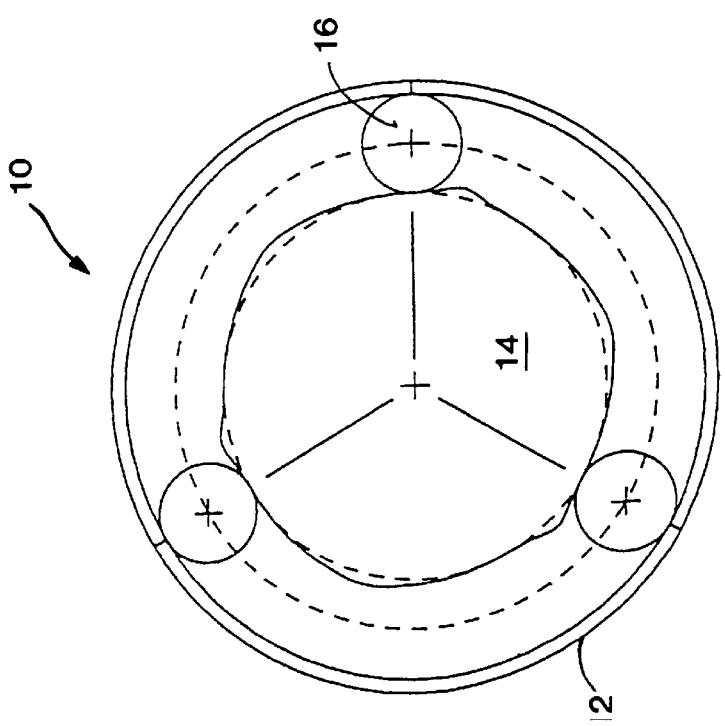

In certain instances, it is desirable to move a fastener in the opposite direction; that is, the torque-angle relationship must be changed such that the fastener is driven the other way. Shown in FIGS. 14A and 14B, is a cam geometry on shaft 14 which may be used to reverse the torque-angle relationship of roller-cam assembly 10. As shown in FIGS. 14A and 14B, the cam geometry is mirrored across the high point of the cam rise. When incorporated into a tool such as that shown and described above with respect to FIG. 13, the roller-cam assembly 10 may be reversed by exciting the oscillating mass (i.e., rotor 34) sufficiently by an oscillating torque from the DC motor to roll rollers 16 over the top of the cam rise and into the stable operating regime on the opposite side (i.e., the reverse position) as shown in FIG. 14B. This reversal may also be accomplished manually by rotating ring 12 to move rollers 16 over the top of the cam rise. As long as operation on this side of the peak cam rise is desired, the excitation is bounded such that the roller excursion does not result in reversal of the torque-angle relationship.

It will be recognized by those having ordinary skill in the art upon reading the teachings of the instant application that other embodiments of the present invention may also be reversed. For example, the embodiment shown in FIG. 12 having a back-up ring 52 may be reversed by rotating the back-up ring independently of and about ring 12 so that the orientation of pockets 53 is reversed (i.e., mirror-imaged about the zero-lift position of cam geometry 51). By so doing, the regions of alternating high and low stiffness are reversed so that the roller-cam assembly 50 will develop a higher torque when ring 12 and back-up ring 52 are rotated together in a clockwise direction from the zero-lift position than when they are rotated in a clockwise direction.

Shown in FIGS. 15A and 15B is another embodiment of a roller-cam assembly 60 according to the present invention which is reversible. Roller-cam assembly 60 is similar to roller-cam assembly 10 shown in FIGS. 4A and 4B except that solid, shaft 14 is replaced with hollow shaft 64 having an internal bore 65 and a reversing mechanism 66 located and rotatable in bore 65. The rotation of reversing mechanism 66 in bore 65 is limited by an index key 67 which fits in a slot located within reversing mechanism 66 and extends axially therefrom for rotation between the positions shown in FIGS. 15A and 15B. Reversal of roller-cam 60 is accomplished by rotating reversing mechanism 66 in bore 65. In the position shown in FIG. 15A, reversing mechanism 66 provides rigid support to hollow shaft 64 at the interface of bore 65 along the arc designated by the points "A-B." Like the back-up ring 52 of roller-cam assembly 50 discussed above, the rigid support zone provided by reversing mechanism 66 develops a higher torque when ring 12 is rotated in the counter-clockwise direction from the zero-lift position than when ring 12 is rotated in the clockwise direction. Upon rotating Upon rotating reversing mechanism 66 to the position shown in FIG. 15B, the rigid support zone provided to hollow shaft 64 is moved along the arc of bore 65 designated by the points "A'-B'". In this position, the roller-cam assembly 60 is reversed such that a higher torque is now developed when ring 12 is rotated in the clockwise direction from the zero lift position than when ring 12 is rotated in the counterclockwise direction.

While embodiments and applications of this invention have been shown and described, it will be apparent to those skilled in the art that many more modifications are possible without departing from the inventive concepts herein described. For example, although the various figures of this application are shown illustrating a roller-cam assemblies having definite numbers of rollers, any number of rollers may be employed depending upon the rolling characteristics desired. All that is required is that at least one of the rollers employed in the roller-cam assembly provide interference between the ring and shaft such that energy is stored as described in detail above. Additional rollers may be provided to provide additional interference or which do not interfere but merely provide rolling support between the ring and shaft.

Additionally, although shown and described above with respect to a rotational spring which applies torque in a relatively elastic manner, it will be readily recognized by those having ordinary skill in the art that the materials incorporated into the component parts will affect this behavior. For instance, components made of steels would provide a low-loss spring, while elastomeric materials can help provide isolation by causing a damping effect. It is envisioned in certain circumstances that in the latter case, materials which cause a more "lossy" behavior (i.e., behavior in which the amount of energy recovered is less than the work it took to originally displace the device) may be incorporated into the roller cam assembly to create this damping effect. For example in the case of power tools, most hand-held pneumatic and electric tools are powered by motors that provide torque to a shaft. This shaft may, in turn, be speed reduced through a set of planetary gears. In either case, torque is typically reacted by the tool housing, and variations in the supplied torque result in vibration and reaction that the user typically must absorb. In this setting, loss can be an attractive feature for damping vibration or reducing a system's response to shock; in this case, the device acts as an absorber or isolator. However, in some cases, very low loss is desired. The present invention lends itself well to either application, depending on the nature of the materials used.

It is understood, therefore, that the invention is capable of modification and therefore is not to be limited to the precise details set forth. Rather, various modifications may be made in the details within the scope and range of equivalents of the claims without departing from the spirit of the invention.

Having described the invention, what is claimed is:

1. A rotational energy storage device comprising:

a shaft;

a ring rotatably disposed about said shaft; and at least one rolling element compressed between said shaft and said ring to form contact zones with each;

a cam geometry disposed on at least one member selected from the group consisting of said ring, said shaft, and said at least one rolling element, and combinations thereof;

said cam geometry comprised of a home position located between a high stiffness camming region and a low stiffness camming region, said high stiffness camming region being configured to provide a higher restoring torque on said at least one rolling element toward said home Position than said low stiffness camming region and said home position being configured to provide a position of minimum interference along said cam geometry between said ring, said at least one rolling element, and said shaft;

such that upon applying a torque to said ring and thereby inducing rotation between said ring and said shaft in a first direction, said at least one rolling element rolls from the home position into a state of greater compression between said ring and said shaft in said low stiffness camming region to elastically deform said ring, said shaft, and said at least one rolling element and store potential energy therein;

and upon applying a torque in an opposite direction and thereby inducing rotation of an equal magnitude to said rotation in said first direction between said ring and said shaft in a second direction, said at least one rolling element rolls between said ring and said shaft into said high stiffness. camming region to elastically deform said ring and said shaft and said at least one rolling element and store potential energy therein in an amount greater than when said at least one rolling element rolls between said ring and said shaft into said low stiffness camming region.

2. The rotational energy storage device recited by claim 1, wherein said cam geometry means is provided externally along said shaft in an axial direction.

3. The rotational energy storage device recited by claim 1, wherein said cam geometry is provided by a sprag geometry on said roller.

4. The rotational energy storage device recited by claim 1, further comprising a cam geometry means on said shaft for causing said at least one roller to interfere with said ring;

said cam geometry means having a first cam profile and a second cam profile with a zero-lift position located between said first and said second cam profiles; and said first cam profile and said second cam profile being asymmetrical about said zero-lift position such that upon moving said at least one roller from said zero-lift position, relatively high and low stiffness presenting regions are respectively provided by said first and said second cam profiles.

5. A rotational energy storage device comprising a shaft;

a ring rotatably disposed about said shaft;

at least one rolling element compressed between said shaft and said ring to form contact zones with each;

a back-up ring disposed concentrically about said ring; and a cam geometry disposed on at least one member selected from the group consisting of said ring, said shaft, said at least one rolling element, said back-up ring, and combinations thereof;

said cam geometry comprised of a home position located between a high stiffness camming region and a low stiffness camming region, said high stiffness camming region being configured to provide a higher restoring torque on said at least one rolling element toward said home position than said low stiffness camming region and said home position being configured to provide position of minimum interference along said cam geometry between said ring, said at least one rolling element, and said shaft;

such that upon applying a torque to said ring and thereby inducing rotation between said ring and said shaft in a first direction, said at least one rolling compression between said ring and said shaft in said low stiffness camming region to elastically deform said ring, said shaft, and said at least one rolling element and store potential energy therein, and upon applying a torque in an opposite direction and thereby inducing rotation of an equal magnitude to said rotation in said first direction between said ring and said shaft in a second direction, said at least one rolling element rolls between said ring and said shaft into said high stiffness camming region to elastically deform said ring and said shaft and said at least one rolling element and store potential energy therein in an amount greater than when said at least one rolling element rolls between said ring and said shaft into said low stiffness camming region.

6. The rotational energy storage device recited by claim 5, wherein said back-up ring comprises alternating thin and thick cross-sectional areas indexed to provide said low and high stiffness regions against each (roller) rolling element.

7. The rotational energy storage device recited by claim 6, wherein said back-up ring is rotatable about said ring to reverse the orientation of said low and high stiffness regions indexed to each rolling element.

8. A rotational energy storage device comprising:

a shaft;

a ring rotatably disposed about said shaft; and a plurality of rolling elements compressed between said shaft and said ring to form contact zones with each;

a cam geometry disposed on at least one member selected from the group consisting of said ring, said shaft, and said plurality of rolling elements;

said cam geometry comprised of a home position located between a high stiffness camming region an a low stiffness camming region, said high stiffness camming region being configured to provide a higher restoring torque on said plurality of rolling elements toward said home position than said low stiffness camming region and said home position being configured to provide a position of minimum interference along said cam geometry between said ring, said plurality of rolling elements, and said shaft;

such that upon applying a torque to said ring and thereby inducing rotation between said ring and said shaft in a first direction, said plurality of rolling elements roll from the home position into a state of greater compression between said ring and said shaft in said low stiffness camming region to elastically deform said ring, said shaft, and said plurality of rolling elements and store potential energy therein;

and upon applying a torque in an opposite direction and thereby inducing rotation of an equal magnitude to said rotation in said first direction between said ring and said shaft in a second direction, plurality of rolling elements roll between said ring and said shaft into said high stiffness camming region to elastically deform said ring and said shaft and said plurality of rolling elements and store potential energy therein in an amount greater than when said at least one rolling element rolls between said ring and said shaft into said low stiffness camming region.

9. The rotational energy storage device recited by claim 8, further comprising a plurality of cam geometry means on said shaft which correspond to and cause said plurality of rolling elements to interfere with said ring.

10. The rotational energy storage device recited by claim 9, wherein said plurality of can geometries comprises:

a plurality of first cam geometries having a first cam profile and a second cam profile with a zero-lift position located between said first and said second cam profiles, said first cam profiles and said second cam profiles being asymmetrical about their corresponding zero-lift positions of each of said first cam geometry means and configured such that upon moving said plurality of rolling elements from said zero-lift positions in a first direction, said rolling elements move along said first cam profiles which provide a higher stiffness region against said rolling elements; and upon moving said plurality of rolling elements from said zero-lift positions in a second direction opposite to said first direction, said rolling elements move along said second cam profiles which provide a lower stiffness region against said rolling elements; and a plurality of second cam geometries which are alternately oriented around said shaft between said plurality of first cam geometries, said second cam geometries having a third cam profile and a fourth cam profile with a zero-lift position located between said third and said fourth cam profiles, said third cam profiles and said fourth cam profiles being asymmetrical about their corresponding zero-lift positions of each of said second cam geometries and configured such that upon moving said plurality of rolling elements from said zero-lift positions in said first direction, said rolling elements move along said fourth cam profiles which provide a lower stiffness region against said rolling elements, and upon moving said plurality of rolling elements from said zero-lift positions in said second direction, said rolling elements move along said third cam profiles which provide a higher stiffness region against said rolling elements;

said rolling elements being collectively movable into and between said zero-lift positions of said first cam geometries and said second cam geometries.

11. The rotational energy storage device recited by claim 10, wherein said plurality of rolling elements is moved into and between said zero-lift positions of said first cam geometries and said second cam geometries by rotating said ring relative to said shaft.

* * * * *